May 5, 1970    J. T. SILER    3,509,618

FASTENER AND ASSEMBLY MEANS

Filed April 17, 1968

INVENTOR
Joseph T. Siler
BY
Wofford & Felsman
ATTORNEYS 3,509,618
FASTENER AND ASSEMBLY MEANS
Joseph T. Siler, P.O. Box 514,
McKinney, Tex. 75069
Filed Apr. 17, 1968, Ser. No. 722,114
Int. Cl. B23p *19/06, 21/00;* B23q *3/18*
U.S. Cl. 29—467                      14 Claims

ABSTRACT OF THE DISCLOSURE

Following is disclosed a method and apparatus for securing "work" and "blind side" structural members, having misaligned holes, by means of a conventional fastener inserted through "work" and "blind side" bushings that have ececntric, axially extending bores. The blind side bushing has one or more indentations formed in its axially extending bore or laterally extending surface and a shaft is sized to extend through the bore of the work side bushing and into the bore of the blind side bushing. A latch element laterally movably carried by the shaft is adapted to extend into and retract from the indentation to enable selective rotation of the blind side bushing for alignment with the bore of the work side bushing.

BACKGROUND

In U.S. Patents Nos. 3,006,443; 3,257,720; and 3,357,730 I disclose new methods and apparatus for connecting structural members having misaligned fastener receiving holes. In those patents, I explain the use of bushings with eccentric, axially extending bores for securing such structural members. In Patent Nos. 3,257,720 and 3,357,730 I explain the use of an elastomer tool for positioning a "blind side" bushing such that its axial bore may be aligned with that of a "work side" bushing. The term "blind side" refers to a structural member or its bushing, which may be partially or completely hidden from view. For example, a full view of such a member or bushing may be obstructed by another structural member, which may be in full view and thus referred to as the "work side" structural member and which carries a "work side" bushing. The utilization of an elastomer tool as disclosed in Patent Nos. 3,257,720 and 3,357,730 performs satisfactorily in many instances, but nevertheless has significant disadvantages, one of which is the difficulty in securely grasping and rotating the blind side bushing to align its axially extending bore with that of the work side bushing. It is difficult to rotate the blind side bushing with such a tool in a positive, slipless manner, especially since the bushing may be secured by interference fit in an opening in the blind side structural member.

It is accordingly my purpose to provide fastener and assembly means for connecting work and blind side structural members through utilization of work and blind side bushings, the latter of which may be rotated from the work side conventionally and without slippage.

Detailed description of a preferred embodiment

Figure 1:
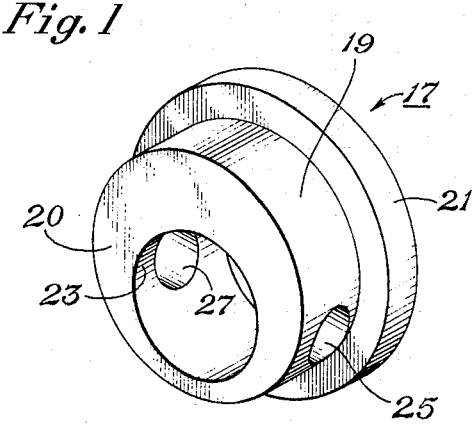
FIG. 1 is a perspective view of a bushing constructed in accordance with the principles of my invention.
Figure 2:
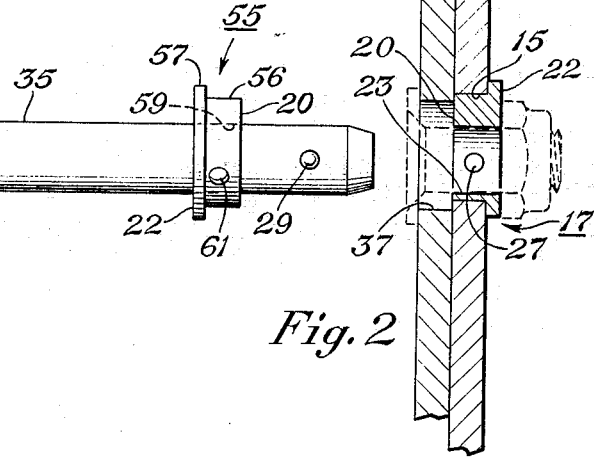
FIG. 2 is a sectional view of two contacting structural members, with a "blind side" bushing assembled therein.

The numeral 11 in FIG. 2 of the drawing designates a "blind side structural member," while the numeral 13 designates a "work side structural member." Inserted in a circular hole 15 in the blind side structural member 11 is a bushing 17 referred to as the "blind side bushing," a preferred construction of which may be better seen in FIG. 1. This bushing has a body portion 19, the exterior of which is cylindrical and concentrically aligned with an enlarged head portion 21. In addition, the bushing has interior and exterior laterally extending end surfaces 20, 22. An axial bore 23 is formed through the enlarged head and body portions of the bushing, being eccentric relative to the central axis of the body and head, as is further explained in my above mentioned patents.

Figure 3:
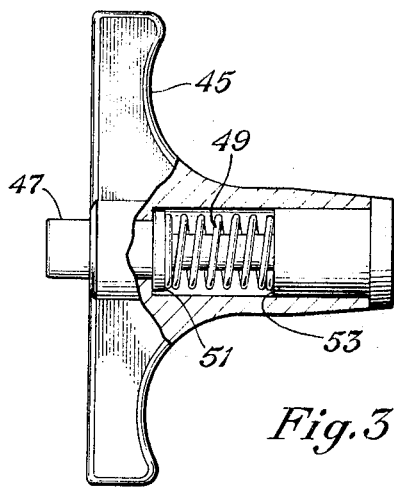
FIG. 3 is a side elevation view, partially in section, of a shaft and its latch element, with a bushing assembled thereon.
Figure 5:
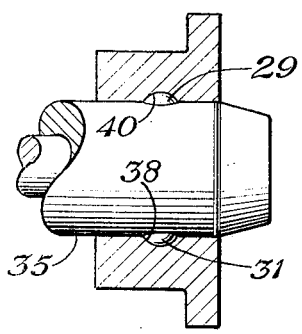
FIGS. 5 and 7 are side elevation views, partially in section, of modified forms of bushings and latch elements.
Figure 4:
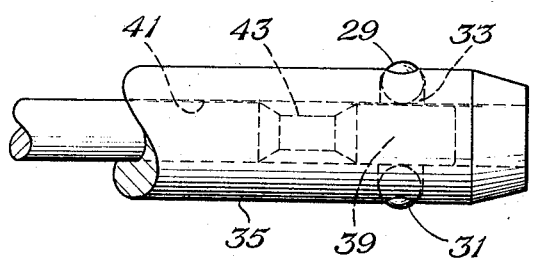
FIG. 4 is a side elevation view of the end portion of the shaft shown in FIG. 3.
Figure 7:
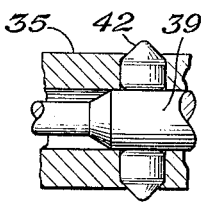

At least one, but preferably plural and here opposed indentations 25 and 27, are formed diametrically across the axial bore, and in this instance extend completely through respective sides of the cylindrical body portion 19 of the bushing 17. The positioning of the indentations and their geometric form, need not be shown but, irrespective of form and position, should be adapted to mate with a latch element 29 or elements, a preferred plural form of which is illustrated in FIGS. 3 and 4. In this form the latch elements comprise two opposed laterally movable balls 29, 31 captively held in a drilled hole 33 formed radially through a shaft 35. The shaft has a diameter smaller than the diameter of the axial bore 23 in the blind side bushing 17, and is adapted to extend through a circular hole 37 in the work side member 13. Alternatively, and to reduce stress, the balls 29, 31 may be used to engage one or more indentations 38, 40 having the form of truncated spheres as shown in FIG. 5. Or, the latch elements may have the form of tapered pins 42 to extend into mating or drilled holes.

The balls 29, 31 are urged into engagement with the indentations 25, 27 (see FIG. 4) or 38, 40 (see FIG. 5) of the blind side bushing 17 by a piston 39 (see FIG. 4) reciprocably mounted in an aperture 41 extending axially through the shaft 35. The piston has an annular groove 43 formed therein such that when positioned adjacent the balls 29, 31 they may retract to positions interior of the shaft 35.

Thus, the piston 39 and groove 43 constitute a portion of an actuator which communicates with the latch elements such that they may be selectively secured within the indentation of the blind side bushing 17.

Actuators of the type shown in FIGS. 3 and 4 are commercially available, having been used previously for different purposes. The piston 39 has a projection 47 that extends through a handle 45. A compression spring 49 is mounted between two radial shoulders 51, 53 in the handle to normally urge the piston to the left as viewed in FIGS. 3 and 4, such that the latch elements 29, 31 are normally urged outward by the piston 39. My invention, however, is not limited to any particular form of actuator or to any particular form of latch elements used.

A "work side" bushing 55 is shown inserted over the shaft 35. This bushing is identical with the blind side bushing, having a cylindrical body portion 56, a cylindrical head portion 57, interior and exterior end surfaces 20, 22, an eccentric aperture 59 and opposed indentations 61, only one of which is visible in FIG. 3.

In operation, the blind side bushing 17 is assembled with the blind side member 11 such that its body portion 19 mates with the hole 15. Upon depressing projection 47 until groove 43 of piston 39 opposes the balls 29, 31 or tapered pin 42, the shaft 35 may then be inserted through the axial bore 59 of the work side bushing 55, through the hole 37 in the work side strucural member 13, and into the axial bore 23 of the blind side bushing 17. The latch elements are rotated by rotation of the handle means 45 and shaft 35 until they are aligned with the opposed indentations 25, 27 of the blind side bushing 17. Then, the projection 47 of the piston 39 is released such that the spring 49 urges the piston 39 to the left as viewed in FIG. 4, forcing the latch elements to be urged outward through the openings formed by the drilled hole 33 in the shaft 35. Hence, the latch elements become blocked in the indentations and rotational movement of the handle 45 may be used to rotate the blind side bushing 17. Also, rotation of the work side bushing 55 may be effected manually until the work side bushing is insertable in the work side hole 37. Then, the projection 47 of the handle 45 is pressed until the annular groove 43 is positioned adjacent the latch elements, enabling them to retract from within the indentations. Thereafter, the shaft may be removed, leaving the bushings secured to the respective structural members, with their axially extending bores aligned.

Figure 6:
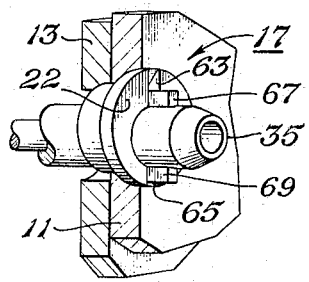
FIG. 6 is a fragmentary perspective view of another form of bushing and latch element.

A modified form of bushing is shown in FIG. 6 in which the blind side bushing 17 has indentations 63, 65 formed on its exterior laterally extending surface 22. Here the indentations are constructed by grooving the surface 22 in arcuate form as shown. The shaft 35 has knife or screwdriver type latch elements 67, 69 the rear edges of which are curved (not shown) and expand into the indentations of which retract therefrom. The rear edges of the latch elements 67, 69 are curved to facilitate retraction of the latch elements when the actuator is being withdrawn from the bore of the blind side bushing.

It should be apparent from the foregoing that I have provided an invention having significant advantages. It is now possible to align bushings having axially extending, eccentric axial bores in work and blind side structural members in a convenient and advantageous manner. The blind side bushing may be securely grasped and easily rotated such that the work side bushing may be properly aligned.

While I have shown my invention in only one of its forms it should be apparent to those skilled in the art that it is not so limited but is susceptible to various changes and modifications without departing from the spirit thereof. The exact form of the structural members, the openings therein, and the bushing can have a wide variety of forms including those shown and described in my above mentioned patents. In addition, and as previously mentioned, the latch elements can have a wide variety of forms to mate with indentations of suitable forms. The specific form of actuator need not be as shown, but may have a variety of geometries and configurations.

What is claimed is:

1. Fastener and assembly means for connecting structural members having misaligned faster receiving holes, said means comprising:
    a work side bushing having an eccentric, axially extending bore, said bushing being positioned in a mating hole in a work side structural member;
    a blind side bushing having an eccentric, axially extenidng bore, and being positioned in a mating hole in a blind side structural member;
    the blind side bushing having at least one indentation formed in its axially extending bore;
    a shaft sized to extend through the bore of the work side bushing and into the bore of the blind side bushing;
    a latch element laterally movably secured to said shaft to extend into said indentation;
    an actuator carried by the shaft and communicating with the latch element to selectively secure and thereafter release the latch element within the indentation.

2. The fastener and assembly means defined by claim 1 which further comprises a plurality of indentations in the blind side bushing, and plural latch elements carried by the shaft for extension therein.

3. The fastener and assembly means defined by claim 2 wherein the latch elements are balls.

4. The fastener and assembly means defined by claim 3 wherein the indentations have the form of truncated spheres which mate with the balls.

5. The fastener and assembly means defined by claim 1 in which said bland side bushing indentation is formed by a hole extending diametrically across the eccentric, axially extending bore and through the bushing.

6. The fastener and assembly means defined by claim 2 wherein said latch element comprises two diametrically opposed balls confined in apertures on the exterior of the shaft, and said actuator comprises a piston carried inside said shaft to engage and extend said balls, and having a grooved portion which when aligned with said balls provides space to enable their retraction.

7. Fastener and assembly means for connecting structural members having misaligned fastener receiving holes, said means comprising:
    a work side bushing having an eccentric, axially extending bore;
    a blind side bushing having an eccentric, axially extending bore and laterally extending interior and exterior end surfaces;
    the blind side bushing having at least one indentation formed in a selected one of its axially extending bores and its exterior lateriatly extending surface;
    a shaft sized to extend through the bore of the work side bushing and into the bore of the blind side bushing to align the bores of the bushings;
    a latch element laterally movably secured to said shaft to extend into said indentation;
    an actuator carried by the shaft and communicating with the latch element to selectively secure and thereafter release the latch element within the indentation.

8. The fastener and assembly means defined by claim 7 which further comprises a plurality of indentations in the blind side bushing, and plural latch elements carried by the shaft for extension therein.

9. The fastner and assembly emans defined by claim 7 wherein said indentation is a groove formed in the exterior surface of the blind side bushing and said latch element mates therewith.

10. Fastener and assembly means for connecting structural members having misaligned fastener receiving holes, said means comprising:
    a work side bushing having an eccentric, axially extending bore;
    a blind side bushing having an eccentric, axially extending bore;
    a shaft sized to extend through the bore of the work side bushing and into the bore of the blind side bushing;
    a latch element laterally movably secured to said shaft to selectively grip and release the blind side bushing;
    an actuator carried by the shaft and communicating with the latch element to selectively secure and release the latch element from the blind side bushing.

11. The method of assembling work and blind side structural members having generally misaligned fastener receiving holes through utilization of work and blind side bushings, said method comprising the steps of:
    forming eccentric, axially extending bores and exterior lateral surfaces in two bushings;
    forming an indentation in a selected one of the bores and an exterior surface of the blind side bushing;
    inserting a bushing in the hole in the blind side structural member to define the blind side bushing;
    inserting a shaft through the bore of a work side bushing, through the hole in the work member and into the bore of the blind side bushing;
positioning a latch element carried by the shaft within said indentation;
rotating the blind side bushing with the shaft and rotating the work side bushing manually to position the work side bushing in a work side hole;
retracting the latch element and shaft;
securing a fastener in the aligned bores.

12. The method defined by claim 11 which further comprises the step of forming the indentation diametrically across the bore of the blind side bushing and carrying opposed latch elements on the shaft.

13. The method of assemblying work and blind side structural members having generally misaligned fastener receiving holes through utilization of work and blind side bushings, said method comprising the steps of:
forming eccentric, axially extending bores and exterior lateral surfaces in two bushings;
forming an indentation in a selected one of the bores and an exterior surface blind side bushing;
inserting a bushing in the hole in the blind side structural member to define the blind side bushing;
inserting a shaft into the bore of the blind side bushing;
positioning a latch element carried by the shaft within said indentation;
rotating the blind side bushing with the shaft and rotating the work side bushing manually to position the work side bushing in a work side hole;
retracting the latch element and shaft;
securing a fastener in the aligned bores.

14. The method defined by claim 13 which further comprises the step of forming the indentation diametrically across the bore of the blind side bushing and carrying opposed latch elements on the shaft.

References Cited

UNITED STATES PATENTS

| | | | |
|---|---|---|---|
| 187,875 | 2/1877 | Loring | 29—237 |
| 975,174 | 8/1910 | Stock | 29—240 X |
| 1,030,907 | 7/1912 | Martin | 81—70 |
| 1,966,520 | 7/1934 | Rayner | 29—240.5 X |
| 2,242,080 | 5/1941 | Kurzina | 29—240 X |
| 2,400,686 | 5/1946 | Cox | 29—237 X |
| 2,528,430 | 10/1950 | Gray | 81—10 |
| 3,032,867 | 5/1962 | Kerr | 29—237 X |
| 3,218,695 | 11/1965 | Fisher | 29—240 X |

WAYNE A. MORSE, Primary Examiner

U.S. Cl. X.R.

29—237, 240, 469, 559; 81—10